Sept. 9, 1952     M. P. BLOMBERG     2,609,757

RAILWAY TRUCK

Filed April 5, 1947

Inventor
Martin P. Blomberg
By
Spencer, Willits, Helwig & Caillio
Attorneys

Patented Sept. 9, 1952

2,609,757

UNITED STATES PATENT OFFICE 2,609,757

RAILWAY TRUCK

Martin P. Blomberg, Hinsdale, Ill., assignor to General Motors Corporation, Detroit, Mich., a corporation of Delaware Application April 5, 1947, Serial No. 739,605

18 Claims. (Cl. 105—197)

1

This invention generally relates to trucks for railway vehicles and more particularly to improved shock absorbing means incorporated therein for cushioning and absorbing vertical, lateral and longitudinal shocks.

An object of the invention is to provide a truck having a shock absorbing cushioning means which gives improved riding and stability of the car body when operating on tangent and curved track for wide variations in load and speed of operation, such as encountered in high speed service.

The means by which this and other objects are obtained will become apparent by reference to the following detailed description and drawing illustrating a railway truck including these means.

Figure 1 of the drawing is a side elevational view of a truck with parts broken away and in section to show details of the invention to better advantage.

Figure 1:
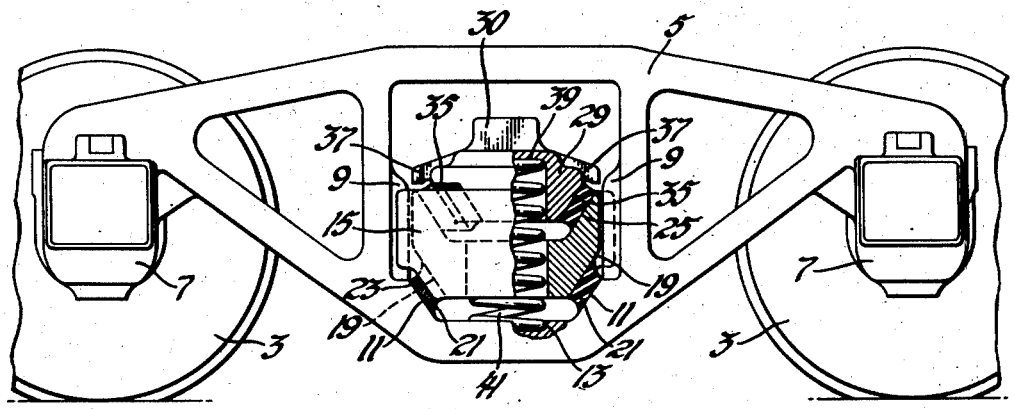
Figure 2:
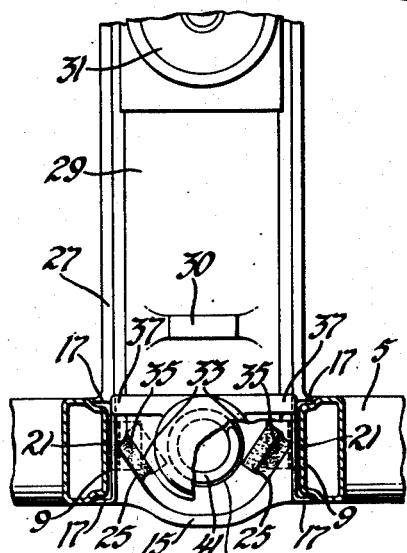
Figure 2 is a partial top plan view with parts broken away and in section.
Figure 4:
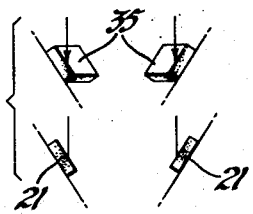
Figure 4 is a diagrammatic vertical elevational view of the arrangement of certain elements of the shock absorbing means.

As best illustrated in Figures 1, 2 and 4 of the drawing, the truck comprises two pairs of wheels 3 and connecting axles, not shown, truck side frames 5 and a transverse tie member 15 therebetween. The truck side frames 5 have journal box portions 7 in which bearings, not shown, are supported on the outer end journal portions of the axles in the usual manner. Plain or antifriction journal bearings of any well known type may be used for reasons to be subsequently given. Each side frame is provided with a central opening with column guide side portions 9 and downwardly converging surfaces 11 located adjacent the lower extremities of the column guides to form a wedge shaped pocket. A spring seat 13 is provided in the central bottom portion of the side frame opening.

The transverse tie member 15 for the opposite side frames 5 is provided with laterally spaced outwardly extending flanges 17 on opposite sides at the ends. The flanges 17 are shown in Figure 2 on either side of the column guides 9 and cooperate therewith to permit free relative vertical sliding movement between the tie member 15 and the side frames 5 to maintain the side frames in parallel relation. The lower end portions of the tie member are also provided with converging surfaces 19 parallel to the converging side frame surfaces 11 to form a wedge. Rubber cushions 21 are positioned between the tie member surfaces 19 forming end wedge portions and each of the side frame surfaces 11 forming the wedge pocket. The cushions 21 are accordingly positioned between the tie member 15 and the side frames 5 to deflect in shear and compression for cushioning and absorbing vertical and longitudinal shocks therebetween. Outer end stop portions 23 are provided on the tie member 15 adjacent each cushion 21 to contact the surfaces 11 on the side frame to limit vertical and longitudinal deflection of the cushions 21 to safe limits. The upper end portions of the tie member 15 are provided with surfaces 25 converging downwardly and inwardly toward the vertical center line of the tie member to form a wedge pocket.

Figures 5A, 5B, 5C:
Figures 5a, 5b and 5c are views similar to Figure 4 showing a modified arrangement of certain of the shock absorbing means.

A bolster 29 having side bearing portions 30 and a center plate 31 secured thereto for supporting the car body, not shown, is also provided with lower end surfaces 33 converging downwardly and inwardly toward the vertical center line, which surfaces are parallel to the surfaces 25 on the tie member, to form a wedge. Rubber cushions 35 are located between the surfaces 33 on the bolster 29 and the surfaces 25 of the tie member 15 to act in shear and in compression and absorb vertical, longitudinal and lateral shocks therebetween. Stop portions 37 are provided on the bolster 29 to contact the tie member 15 and thereby limit the compression and shear action of the cushions 35 to safe limits. A spring seat 39 is provided on each end of the bolster 29 and a helical spring 41 is placed between each of these seats and each side frame seat 13, the spring is shown extending through an enlarged opening in the tie member 15, as best shown in Figure 1, and is therefore free to deflect vertically, longitudinally and laterally. As each pair of surfaces 25—33 at the opposite ends of the bolster 29 and transverse truck frame tie member 15 converge downwardly toward the vertical center line of the truck, the bolster supporting cushions 35 therebetween deflect in shear and in compression and cushion and absorb vertical, longitudinal and transverse shocks therebetween. Also with this arrangement of bolster cushions and cushion supporting surfaces the centrifugal force on the bolster 29 and body, when rounding a curve, acts laterally and the cushions 35 at the opposite ends deflect unequally in shear and in compression to cushion and absorb this force which causes the bolster and body supported thereon to swing laterally about a point above the bolster center plate and thus cause banking of the bolster and body in the proper direction to oppose the normal rolling tendency thereof. It transverse movement without banking of the bolster is desired the bolster cushions 35 and supporting surfaces 25—33 are arranged as shown schematically in Figure 5a, converging downwardly below the bolster toward the transverse center plane of the truck. In order to vary the relation between shear and compression deflections of the bolster cushions 35 the two cushions and supporting surfaces 25—33 therefor at opposite ends may be arranged at different angles such as shown in Figures 5b and 5c in order to provide different degrees of lateral swinging and banking movement of the bolster and body relative to the truck frame. In both of these arrangements the surfaces 25—33 at opposite ends of the bolster and opposite sides of the frame converge downwardly and inwardly at different angles toward the vertical center line of the truck. On trucks in which the opposite side and transverse members are rigidly secured together it will be evident that the bolster may be mounted in a similar manner directly on the frame by providing surfaces at each side frame similar to those on the ends of the bolster with suitable rubber cushions therebetween and by means of helical springs between the bolster and frame.

Figure 3:
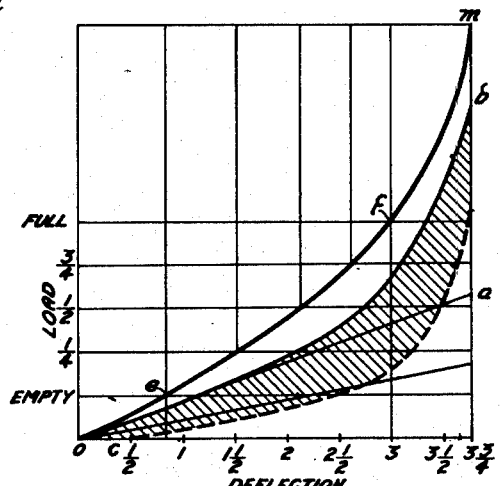
Figure 3 is a load deflection curve showing the characteristics of the shock absorbing suspension means.

The load deflection characteristics of the shock absorbing and cushioning suspension of the truck illustrated in the accompanying drawing are shown in Figure 3. The load deflection curve of the helical spring is a straight line o—a as the rate is constant. The load deflection curve of the cushions 21—35 arranged in series relation and acting in shear and in compression is a hysteresis loop o—b—c. The area of the loop between the upper load application curve o—b and the lower load release curve b—c—o represents the energy absorbed by the cushions. The combined parallel action of the helical spring 39 and cushions 21—35 is shown by the curve o—e—f—m providing a variable rate. Point e represents the load and deflection of the spring and cushion combination when the car body is empty, point f the load and deflection when the body is fully loaded and point m the maximum safe load and deflection limit when the bolster stops 37 are in contact with the tie member 15 and the stops 23 of the tie member are in contact with the surfaces 11 of side frames 5.

It will be noted that ample shock absorbing action is provided by this shock absorbing suspension when the body is empty, greater shock absorbing action at full load and ample shock absorbing action up to maximum loading when the stops act to prevent overloading.

The advantages mentioned above for cushioning and absorbing vertical, longitudinal and lateral shocks between the body and side frames and for banking of the bolster and body to oppose the normal rolling tendency on curves enables antifriction journal bearings to be used as there is less tendency of Brinelling action of the bearing races by the bearing balls or rollers when draft or buffing forces are applied to the bodies in order to start the car when the wheels are frozen to the track or when lubricant has been squeezed out from between the races and rollers or balls of these bearings after standing for a time.

Similar shock absorbing and load and deflection characteristics may be obtained with one set of rubber cushions and helical springs located between the bolster and frame and acting in parallel.

I claim:

1. In a railway truck, a transverse member having opposite end surfaces inclined downwardly and inwardly toward the longitudinal and vertical axes of said member, a truck bolster having opposite end surfaces adjacent the end surfaces of said member and similarly inclined and shock absorbing cushions between said adjacent surfaces acting in shear and in compression.

2. In a railway truck, a transverse member having opposite end surfaces inclined downwardly and inwardly with respect to the longitudinal and vertical axes of said member, a truck bolster having opposite end surfaces adjacent said end surfaces of said member and similarly inclined, rubber shock absorbing cushions between said adjacent surfaces for acting in shear and in compression, and stops on said bolster engageable with said member to limit vertical movement between said bolster and said member.

3. In a railway truck, a transverse member having surfaces on opposite ends inclined downwardly and inwardly with respect to the ends and sides and toward each other, a truck bolster having similarly inclined surfaces on the opposite ends adjacent the surfaces on said member and rubber shock absorbing cushions between said member and said bolster surfaces acting in shear and in compression for cushioning and absorbing vertical, longitudinal and transverse shocks between said member and said bolster and for causing transverse swinging and banking movement of said bolster relative to said member.

4. In a railway truck, a transverse member having converging surfaces on opposite ends, a truck bolster having converging surfaces on the opposite ends adjacent the surfaces of said member, all of said surfaces converging downwardly and inwardly with respect to the longitudinal and vertical center lines of said member and said bolster and shock cushions between said adjacent surfaces acting in shear and in compression for cushioning vertical, longitudinal and transverse shocks between said member and said bolster.

5. In a railway truck, a transverse member having vertically converging surfaces on opposite ends, a truck bolster having similarly converging surfaces on opposite ends adjacent the surfaces of said member, all of said surfaces converging downwardly and inwardly with respect to the adjacent ends and sides of said member and said bolster, shock absorbing cushions between said adjacent surfaces acting in shear and in compression, and stops on said bolster engageable with said member to limit vertical movement therebetween.

6. In a railway truck, a pair of side frames, a transverse tie member vertically slidable in the side frames having downwardly and inwardly inclined end surfaces, a truck bolster having similarly inclined end surfaces adjacent the surfaces of said member, rubber shock absorbing cushions between said adjacent surfaces, and unguided springs between said bolster and said side frames.

7. In a railway truck, a pair of side frames having column guides, a transverse tie member slidable in the column guides, a truck bolster, unguided supporting spring between said bolster and said side frames, said bolster having downwardly and inwardly converging surfaces on the opposite ends, said bolster having surfaces on the opposite ends adjacent the surfaces of said member and converging in the same direction and rubber cushions between said member and said bolster surfaces for cushioning and absorbing vertical, longitudinal and transverse shocks therebetween and for permitting transverse banking movement of said bolster relative to said member.

8. In a railway truck frame, a transverse member vertically slidable in opposite sides of the frame and having vertically converging surfaces on opposite ends, a truck bolster having similarly converging surfaces on the opposite ends adjacent the surfaces of said member, cushions between said adjacent surfaces acting in shear and in compression for absorbing vertical, longitudinal and transverse shocks therebetween, and unguided springs between said bolster and said frame.

9. In a railway truck, a pair of side frames, a tie member supported therebetween, a bolster, said tie member and said bolster having adjacent vertically converging surfaces at the opposite ends, all of said adjacent surfaces converging downwardly and inwardly toward the transverse and longitudinal center planes of said member and said bolster and rubber cushions between said adjacent surfaces for cushioning vertical, longitudinal and transverse shocks therebetween.

10. In a railway truck, a pair of side frames, a tie member supported therebetween, a bolster, helical springs between said bolster and said side frames, said tie member and said bolster having adjacent vertically converging surfaces at the opposite ends, and rubber cushions between said adjacent surfaces for cushioning vertical, longitudinal and transverse shocks therebetween.

11. In a railway truck, a pair of side frames, a tie member supported therebetween, a bolster, said tie member and said bolster having adjacent surfaces at each end, all of said surfaces converging downwardly and inwardly toward the longitudinal and transverse center planes of said member and said bolster and rubber cushions between said adjacent surfaces acting in shear and in compression for cushioning and absorbing vertical and longitudinal movement therebetween and for allowing and absorbing transverse banking movement of said bolster relative to said tie member.

12. In a railway truck, a pair of side frames, a tie member supported therebetween, a bolster, unguided helical springs between said bolster and said side frames, said tie member and said bolster having adjacent downwardly and inwardly converging surfaces at each end and rubber cushions between said adjacent surfaces acting in shear and in compression for cushioning and absorbing vertical, longitudinal movement therebetween and for allowing and absorbing transverse banking movement of said bolster relative to said tie member.

13. In a railway truck, a pair of side frames each having vertical converging surfaces, a transverse tie member vertically movable on said side frames and having vertically converging surfaces at opposite ends adjacent each of said side frame surfaces, a transverse bolster member, said tie member and said bolster having adjacent end surfaces converging downwardly and inwardly with respect to the ends and sides of said member and said bolster and rubber cushions between each of said adjacent surfaces acting in shear and in compression.

14. In a railway truck, a pair of side frames, a transverse tie member vertically movable thereon, a transverse bolster member, unguided helical springs between said bolster and said side frames, said side frames and said tie member having adjacent vertically converging surfaces, said tie member and said bolster having adjacent vertically converging surfaces spaced transversely apart and rubber cushions between each of said adjacent surfaces acting in shear and in compression.

15. In a railway truck, a pair of side members, a transverse tie member vertically movable thereon, a transverse bolster member, unguided helical springs between said bolster and said side frames, said side frames and said tie member having adjacent vertically converging surfaces, said tie member and said bolster having adjacent vertically converging surfaces spaced apart transversely, rubber shock absorbing cushions between each of said adjacent surfaces acting in shear, in compression and stop means on said tie member engageable with said side frames for limiting vertical movement therebetween and stop means on said bolster engageable with said tie member for limiting vertical movement therebetween.

16. In a railway truck, a pair of side frames, a transverse tie member vertically movable thereon, a transverse bolster member, said side frames and said tie member having adjacent surfaces converging downwardly with respect to the longitudinal center plane of said tie member, rubber shock absorbing cushions acting in shear and in compression between said adjacent side frame and tie member surfaces to cushion and absorb vertical and longitudinal movement therebetween, said tie member and said bolster having downwardly and inwardly inclined surfaces at each end and rubber shock absorbing cushions acting in shear and in compression between said tie member and said bolster surfaces to cushion and absorb vertical, longitudinal and transverse banking movements of said bolster relative to said tie member.

17. In a railway truck, a pair of side frames, a transverse tie member vertically movable thereon, a transverse bolster member, helical springs between said bolster and said side frames, said side frames and said tie member having vertically converging adjacent surfaces, rubber shock absorbing cushions acting in shear and in compression between said adjacent side frame and tie member surfaces to cushion and absorb vertical and longitudinal movement therebetween, said tie member and said bolster having downwardly and inwardly inclined surfaces at each end and rubber shock absorbing cushions acting in shear and in compression between said tie member and said bolster surfaces to cushion and absorb vertical, longitudinal and transverse banking movements of said bolster relative to said tie member.

18. In a railway truck, a pair of side frames, a transverse tie member vertically movable thereon, a transverse body supporting bolster, helical springs between said bolster and said side frames, said side frames and said tie member having vertically converging surfaces, rubber shock absorbing cushions acting in shear and in compression between said adjacent surfaces for cushioning and absorbing vertical and longitudinal shocks therebetween, said side frames and said tie member having stops to limit vertical movement therebetween, said tie member and said bolster having downwardly and inwardly inclined surfaces at each end, rubber shock absorbing cushions acting in shear and in compression between said tie member and bolster surfaces to cushion and absorb vertical, longitudinal and transverse banking movements of said bolster relative to said member and stop means on said bolster and said tie member for limiting vertical movement therebetween.

MARTIN P. BLOMBERG.

REFERENCES CITED

The following references are of record in the file of this patent:

UNITED STATES PATENTS

| Number | Name | Date |
|---|---|---|
| 1,226,756 | Dougherty | May 22, 1917 |
| 1,484,954 | Masury | Feb. 26, 1924 |
| 1,608,856 | Masury | Nov. 30, 1926 |
| 1,810,718 | Lord | June 16, 1931 |
| 2,023,756 | Brownyer | Dec. 10, 1935 |
| 2,046,391 | Latshaw | July 7, 1936 |
| 2,211,462 | Hobson | Aug. 13, 1940 |
| 2,402,501 | Ledwinka | June 18, 1946 |

FOREIGN PATENTS

| Number | Country | Date |
|---|---|---|
| 487,468 | Great Britain | June 21, 1938 |
| 839,397 | France | Jan. 4, 1939 |